(12) United States Patent
Paul et al.

(10) Patent No.: US 10,366,808 B2
(45) Date of Patent: Jul. 30, 2019

(54) HIGH-VOLTAGE APPARATUS AND METHOD FOR PRODUCING SAME

(71) Applicant: SIEMENS AKTIENGESELLSCHAFT, Munich (DE)

(72) Inventors: Christian Paul, Alfter (DE); Tim Schnitzler, Kreuzau (DE); Joachim Titze, Ratingen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/777,419

(22) PCT Filed: Dec. 16, 2015

(86) PCT No.: PCT/EP2015/079954
§ 371 (c)(1),
(2) Date: May 18, 2018

(87) PCT Pub. No.: WO2017/101992
PCT Pub. Date: Jun. 22, 2017

(65) Prior Publication Data
US 2018/0336978 A1    Nov. 22, 2018

(51) Int. Cl.
*H01B 7/02* (2006.01)
*H01B 3/42* (2006.01)
(Continued)

(52) U.S. Cl.
CPC ............... *H01B 7/02* (2013.01); *H01B 1/02* (2013.01); *H01B 3/42* (2013.01); *H01B 13/08* (2013.01);
(Continued)

(58) Field of Classification Search
CPC ... H01B 7/02; H01B 1/02; H01B 3/42; H01B 17/583; H02G 3/0616
See application file for complete search history.

(56) References Cited

U.S. PATENT DOCUMENTS

| 3,783,181 A | 1/1974 | Martincic et al. |
| 4,424,551 A | 1/1984 | Stevenson et al. |
| 2017/0047721 A1 | 2/2017 | Engels et al. |

FOREIGN PATENT DOCUMENTS

| DE | 2911402 A1 * | 10/1980 | ............. H01B 17/28 |
| DE | 2911402 A1 | 10/1980 | |

(Continued)

*Primary Examiner* — Hoa C Nguyen
*Assistant Examiner* — Amol H Patel
(74) *Attorney, Agent, or Firm* — Laurence Greenberg; Werner Stemer; Ralph Locher

(57) ABSTRACT

A high-voltage apparatus contains an internal conductor, an insulating body which surrounds the internal conductor along its longitudinal direction and has insulating layers which are composed of a synthetic material which is impregnated with a resin, and also electrically conductive control inserts for field control which are arranged concentrically around the internal conductor and are spaced apart from one another by the insulating layers. At least one of the control inserts is a contact insert which is electrically connected to the internal conductor by a contact-making device. The contact-making device has a contact element which is composed of electrically conductive material and is electrically connected to the contact insert. The contact element is fixed by adhesive bonding to a conductive substrate which is in electrical contact with the internal conductor.

12 Claims, 1 Drawing Sheet

(51) Int. Cl.
*H01B 13/08* (2006.01)
*H01B 1/02* (2006.01)
*H01B 17/28* (2006.01)
*H01B 19/00* (2006.01)
*H02G 15/107* (2006.01)

(52) U.S. Cl.
CPC ............. *H01B 17/28* (2013.01); *H01B 19/00* (2013.01); *H02G 15/107* (2013.01)

(56) References Cited

FOREIGN PATENT DOCUMENTS

| GB | 345604 A | 3/1931 |
|----|----------|--------|
| WO | 2015172806 A1 | 11/2015 |

\* cited by examiner

HIGH-VOLTAGE APPARATUS AND METHOD FOR PRODUCING SAME

BACKGROUND OF THE INVENTION

Field of the Invention

The invention relates to a high-voltage device having an internal conductor, an insulating body that surrounds the internal conductor along its longitudinal direction, comprising insulating layers of a synthetic material that is impregnated with a resin, and electrically conductive control inserts so as to provide the field control, said control inserts being arranged in a concentric manner around the internal conductor and being spaced apart from one another by means of the insulating layers, wherein at least one of the control inserts is a contact insert that is connected in an electrical manner to the internal conductor by means of a contact-making device, wherein the contact-making device comprises a contact element that is configured from an electrically conductive material that is connected in an electrical manner to the contact insert.

High-voltage devices of this type are known from the prior art. They generally have the task of insulating a high-voltage line from its environment, wherein the environment is essentially at ground potential and said high-voltage line comprises a current-carrying current conductor and is at a high-voltage potential.

However, the internal conductor of the known high-voltage device is mostly not an ideal cylinder-symmetrical shape and its surface has irregularities that are caused during the production process. For these reasons, the field distribution in the environment of the internal conductor is generally not homogenous which may result in the functionability of the high-voltage device being reduced.

Furthermore, it is necessary for electro-technical reasons to connect the internal conductor to the contact insert in an electrical manner by means of the contact-making device. This is also referred to as a 'contact-making arrangement'.

WO 2015/172806 A1 discloses a high-voltage device in the form of a high-voltage feedthrough having insulating layers that comprise a synthetic material in the form of a non-woven synthetic material. In the case of the high-voltage feedthrough known from WO 2015/172806 A1, the contact element is provided by means of a flexible metal band. The metal band is fixed at one of its ends to the internal conductor and at the other end to the contact insert. Moreover, the metal band is fixedly surrounded by an insulating material of the insulating body.

SUMMARY OF THE INVENTION

The object of the invention is to propose a high-voltage device of this type that provides a reliable as possible voltage insulation.

The object is achieved in the case of a high-voltage device of this type by virtue of the fact that the contact element is fixed by means of adhesive to a conductive base layer that is in electrical contact with the internal conductor.

The high-voltage device in accordance with the invention has the advantage that the contact element is connected to the base layer without the use of solder. This means that it is possible when the high-voltage device is being produced to forego the soldering work in the immediate proximity of the insulating body. Such soldering work could otherwise be necessary so as to produce a permanent electrical contact the contact site between the contact element and base layer. It is possible, in particular if the insulating body comprises synthetic materials, for the insulating body that surrounds the soldering site to become damaged during such a soldering process. It is possible for synthetic materials to melt or catch fire when soldering work is performed in their immediate proximity. The high-voltage device in accordance with the invention renders it possible in an advantageous manner to avoid such damage to the insulating body which could result in a localized reduction in the dielectric strength. It is consequently possible in an advantageous manner to increase the reliability of the entire high-voltage device.

Since the contact element in the ready-to-use state is located radially between the internal conductor and the contact insert, the contact element is fixed by means of adhesive in an appropriate manner to the base layer prior to the contact insert being applied preferably by means of winding. It is in particular possible that the contact element itself is configured from multiple pieces, wherein multiple components of the contact element may be connected to one another outside the high-voltage device also by means of soldering. The advantages of the high-voltage device in accordance with the invention are realized by virtue of the fact that the entire contact element is fixed to the base layer by means of an adhesive, therefore an adhesive connection is provided between the contact element and the base layer.

The high-voltage device in accordance with the invention is by way of example a high-voltage feedthrough that may be part of a high-voltage system. The high-voltage system may be for example a gas-insulated switchgear, a high-performance transformer or also a convertor. The high-voltage feedthrough is fastened in an appropriate manner to a wall of the high-voltage system and is used so as to insulate the connections or lines of the high-voltage system with respect to the ground potential.

In accordance with one embodiment of the invention, the contact element comprises a first contact piece and a flexible second contact piece that is connected to the first contact piece, wherein the first contact piece is fixed to the base layer and the second contact piece is in electrical contact with the contact insert. The two contact pieces may be configured from the same or also in each case from a different electrically conductive material. They may be connected to one another by means of a solder connection. The first contact piece is expediently formed in an advantageous as possible manner so as to be connected by means of an adhesive to the base layer. The second contact piece is expediently formed in a most advantageous as possible manner so as to make electrical contact with the contact insert. By way of example, the first contact piece may be planar and rigid so as to be adhered to a planar base layer and the second contact piece may be elongated and flexible so as to be connected to the contact insert.

It is preferred that the first contact piece is a planar piece is configured from tin-plated copper. The planar piece may be configured as a planar disc or plate. The shape corresponds in an appropriate manner to the shape of the base layer, with the result that it is possible for the planar piece and the base layer to fit against one another in a planar manner.

It is preferred that the first contact piece is edged on the base layer by means of an adhesive material. It is possible in this manner to sufficiently fix the contact element on the base layer, wherein simultaneously a direct contact is produced between the base layer and the contact piece. This ensures the electrical contact between the base layer and the contact element.

In an appropriate manner, the second contact piece is a metal band. The metal band is particularly suitable owing to its flexibility so as to produce the electrical connection with the contact insert during the process of producing the high-voltage device.

In accordance with one embodiment of the invention, the base layer is an outer surface of the internal conductor. In this case, the contact element is fixed directly to the internal conductor. The contact insert is the control insert that is lying nearest to the internal conductor.

In accordance with a further embodiment of the invention, the base layer is a first control insert that is connected in an electrical manner to the internal conductor by means of a further contact element of the contact-making device. The contact insert is not the control insert that is lying nearest to the internal conductor. In some applications, by way of example if the high-voltage device is a cable end for connecting a cable to a conductor of a free line, it may be of advantage if the contact-making arrangement comprises multiple control inserts. In other words, a plurality of control inserts is at the potential of the internal conductor when the high-voltage device is being operated. A conductive connection between the internal conductor and the control insert that is functioning as the base layer may be produced in the same manner as previously described. However, other types of the connection are also conceivable, by way of example via an end face of the high-voltage device.

It is preferred that the synthetic material is a non-woven synthetic material. Non-woven material comprises in particular favorable characteristics as an insulating material. It is possible using the non-woven synthetic material to produce in particular homogenous insulating layers. In addition, a resin-impregnated non-woven synthetic material absorbs less moisture in comparison to resin-impregnated paper. However, it is likewise conceivable if another suitable synthetic material is used, such as by way of example a woven synthetic material.

It is preferred that the non-woven synthetic material comprises polyester. The non-woven synthetic material may be constructed from continuous filaments that are configured from polyester. It is likewise possible if the non-woven synthetic material comprises other materials, by way of example other suitable thermoplastic synthetic materials. In accordance with one variant of the invention, the non-woven synthetic material comprises polyethylene.

The invention relates moreover to a method for producing a high-voltage device.

The object of the invention is to provide such a method that renders it possible to produce a reliable as possible high-voltage feedthrough.

The object is achieved by virtue of a method of this type, in which an internal conductor is provided as a winding carrier and insulating layers that comprise a synthetic material are wrapped around said winding carrier in an alternating manner with conductive control inserts so as to provide the field control, with the result that an insulating body that surrounds the internal conductor is formed, wherein one of the control inserts is a contact insert that is connected in an electrical manner to the internal conductor, wherein an at least in part flexible contact element that is configured from a conductive material is fixed by means of an adhesive onto a base layer that is in electrical contact with the internal conductor and conjointly wound, prior to the winding of the contact insert an opening is provided in the insulating body, wherein the contact element is unfurled through the opening, and subsequently an electrical connection is produced between the contact element and the contact insert by virtue of winding the contact insert.

In accordance with the invention, the insulating body is formed by means of winding the insulating layers in an alternating manner with the control inserts, wherein naturally multiple insulating layers may be wound between two control inserts. If the base layer is formed by means of the surface of the internal conductor itself, the contact element is fixed or adhered to the internal conductor prior to the winding of the insulating layers, and is thus conjointly wound. The insulating layers are wrapped around the internal conductor and simultaneously also around the contact element. If the base layer is formed by means of one of the control inserts, by way of example by means of a control insert that is nearest to the internal conductor, then the contact element is adhered to the relevant control insert after the winding of the relevant control insert. Further insulating layers are subsequently wrapped around the relevant control insert and simultaneously around the contact element. It is naturally likewise possible to produce a conductive connection between the relevant control insert and the internal conductor as described in connection with the method in accordance with the invention. Prior to the winding of the contact insert, an opening is provided in the insulating body, by way of example cut-out, at the site of the insulating body where the contact element is arranged in a wound state. The contact element may then be unfurled through the opening in the radial direction, with the result that at least one part of the contact element extends outwards in the radial direction. The contact insert may be subsequently wound. An electrical connection is consequently produced between the contact element and the contact insert. The remaining insulating layers and the remaining control inserts are then wound onto the contact insert, with the result that the entire insulating body is formed. It is to be noted that the insulating body must not surround the internal conductor in an axial manner along its entire length. On the contrary, it is possible that the internal conductor is guided out of the insulating body at one end or at the two ends. The entire insulating body may subsequently be impregnated with a curable resin, by way of example an epoxy resin. For this purpose, the insulating body is saturated with the resin and subsequently subjected to a drying process. The control inserts are preferably formed from an aluminum foil.

It is preferred that the opening is filled with an insulating material prior to the winding of the contact insert. Consequently, it is possible to ensure the dielectric strength of the high-voltage device also at the site of the opening. It is particularly preferred that the opening is filled with the material of insulating layers, the non-woven synthetic material.

Furthermore, it is possible in the case of the method in accordance with the invention to use individually or in combination all the features that are described in connection with the high-voltage device in accordance with the invention.

The invention is explained below with reference to an exemplary embodiment that is described in FIGS. 1 and 2.

DESCRIPTION OF THE INVENTION

Figure 1:
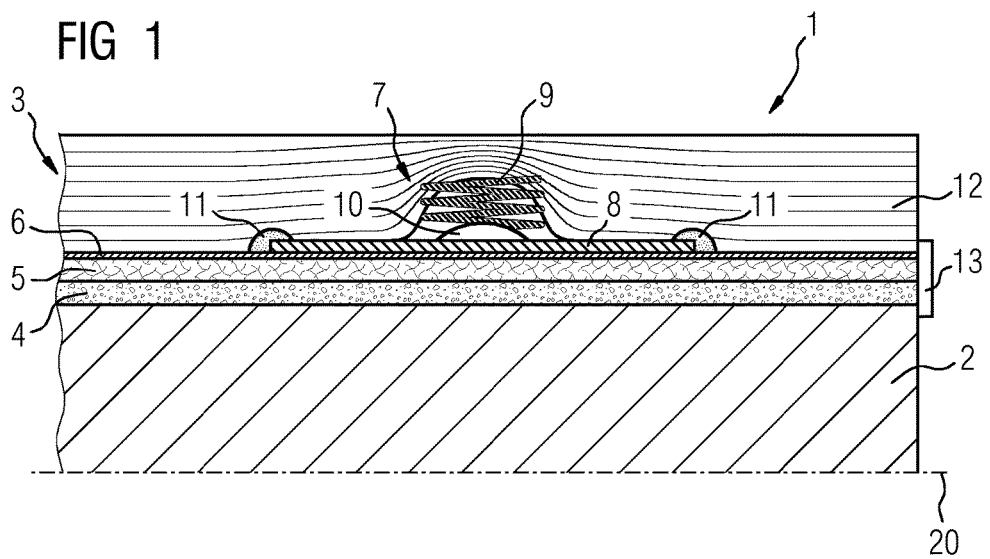
FIG. 1 illustrates an exemplary embodiment of a high-voltage device in accordance with the invention in a first state.

In detail, FIG. 1 illustrates a schematic partial view through a high-voltage device 1. The high-voltage device 1 comprises an internal conductor 2 that is configured from aluminum and is surrounded by an insulating body 3 in a longitudinal direction 20. A cork layer 4 for reducing mechanical stresses in the high-voltage device 1 is arranged between the internal conductor 2 and the insulating body 3.

The high-voltage device 1 that is illustrated in FIG. 1 is in a first state in which the insulating body 3 is not fully formed. So as to clarify the production process, some components are enlarged in FIG. 1, with the result that the relative sizes are only to be understood in a schematic manner and do not necessarily correspond exactly to the true relative sizes.

The insulating body 3 that is formed in part comprises a first insulating layer 5 between the cork layer 4 and a first control insert 6 that lies closest to the internal conductor 2. The control insert 6 is configured from a thin aluminum foil.

The high-voltage device 1 comprises also a contact-making device so as to produce an electrical connection between a contact insert 14 (cf. FIG. 2) and the internal conductor 2.

The contact-making device comprises a contact element 7 having a first contact piece 8 and a second contact piece 9 that are connected to one another in an electrically conductive manner by means of a solder connection 10. The first contact piece 8 is placed as a planar piece that is configured from tin-plated copper on the control insert 6 and adhered thereto, wherein an edging 11 of the first contact piece 8 is formed by means of an adhesive. The second contact piece 9 is formed by a flexible copper band. The second contact piece 9 folded together in a concertina-like manner prior to the winding of a second insulating layer 12.

The contact-making device comprises also a further electrically conductive contact element 13 between the control insert 6 and the internal conductor 2. The further contact element 13 is only schematically illustrated in FIG. 1.

Figure 2:
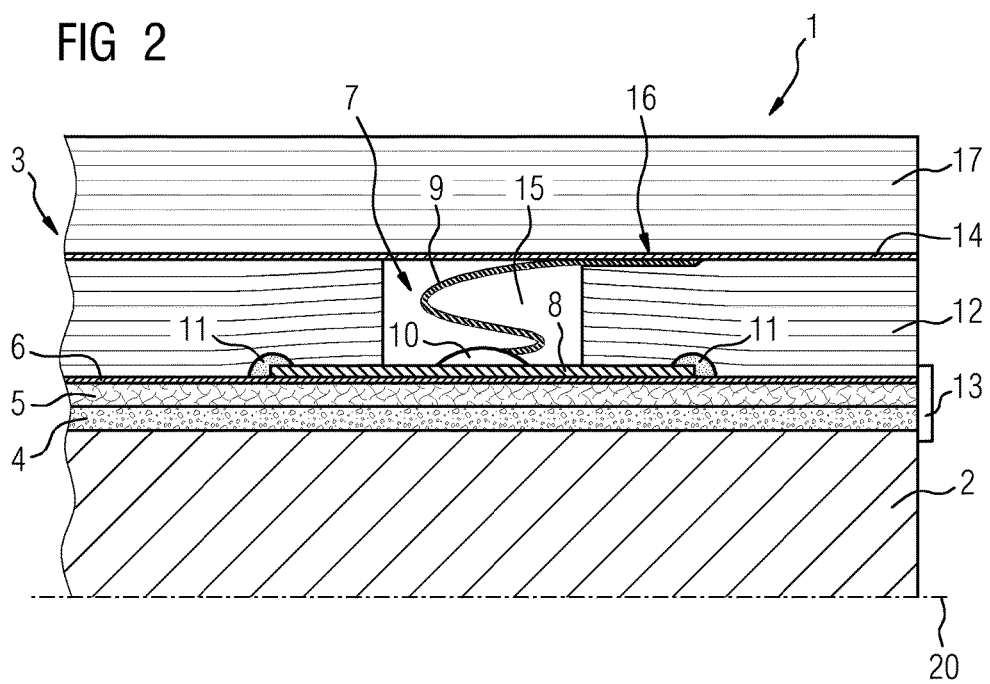
FIG. 2 illustrates the high-voltage device shown in FIG. 1 in a second state.

The high-voltage device 1 shown in FIG. 1 is illustrated in FIG. 2 in the second state, namely after the winding of the contact insert 14. Like and similar elements are provided with like reference numerals in FIGS. 1 and 2.

The insulating body 3 comprises an opening 15 that would be cut into the insulating body 3 or rather into the second insulating layer 12 prior to the winding of the contact insert 14. The second contact piece 9 is unfurled through the opening 15, with the result that said second contact piece extends to the height of the contact insert 14. In order to provide better contact, the second contact piece 9 is placed over a site 16 of the second insulating layer 12 that is adjacent to the opening 15. The contact insert 14 is subsequently wrapped around the second insulating layer 12, wherein the second contact piece that is placed on the site 16 is conjointly wound, with the result that a reliable electrical contact is produced between the contact element 7 and the contact insert 14. It is subsequently possible to wind a third insulating layer 17 and further control inserts and insulating layers (not graphically illustrated in FIG. 2). The entire high-voltage device 1 is impregnated with an epoxy resin after the winding process, with the result that a compact block is produced that may be mounted directly on a high-voltage system by means of a fastening flange.

The invention claimed is:

1. A high-voltage device, comprising:
    an internal conductor;
    an insulating body surrounding said internal conductor along a longitudinal direction, said insulating body including:
        insulating layers configured from a synthetic material that is impregnated with a resin; and
        electrically conductive control inserts for providing field control, said electrically conductive control inserts being disposed in a concentric manner around said internal conductor and being spaced apart from one another by means of said insulating layers, at least one of said control inserts is a conductive base layer; and
    a contact-making device, at least one of said control inserts is a contact insert that is connected in an electric manner to said internal conductor by means of said contact-making device, said contact-making device having a contact element configured from an electrically conductive material that is connected in an electrical manner to said contact insert, said contact element being fixed by means of an adhesive to said conductive base layer being in electrical contact with said internal conductor.

2. The high-voltage device according to claim 1, wherein said contact element has a first contact piece and a flexible second contact piece that is connected to said first contact piece, wherein said first contact piece is fixed to said conductive base layer and said flexible second contact piece is in electrical contact with said contact insert.

3. The high-voltage device according to claim 2, wherein said first contact piece is a planar piece that is configured from tin-plated copper.

4. The high-voltage device according to claim 3, wherein said first contact piece is edged on said conductive base layer by means of said adhesive.

5. The high-voltage device according to claim 2, wherein said flexible second contact piece is a metal band.

6. . The high-voltage device according to claim 1, wherein said conductive base layer is an outer surface of said internal conductor.

7. The high-voltage device according to claim 1, wherein:
    said contact-making device has a further contact element; and
    said conductive base layer is a first control insert that is connected in an electrical manner to said internal conductor by means of said further contact element of said contact-making device.

8. The high-voltage device according to claim 1, wherein said synthetic material is a non-woven synthetic material.

9. The high-voltage device according to claim 8, wherein said non-woven synthetic material contains polyester.

10. A method for producing a high-voltage device, which comprises the steps of:
    providing an internal conductor as a winding carrier;
    winding insulating layers formed of a synthetic material around the winding carrier in an alternating manner with conductive control inserts so as to provide field control, with a result that an insulating body surrounding the internal conductor is formed, wherein one of the conductive control inserts is a contact insert that is connected in an electrical manner to the internal conductor;
    fixing an at least in part flexible contact element configured from a conductive material by means of an adhesive onto a base layer that is in electrical contact with the internal conductor, and conjointly wound;
    prior to the winding of the contact insert an opening is provided in the insulating body, wherein the flexible contact element is unfurled through the opening; and
    subsequently producing an electrical connection between the contact element and the contact insert by virtue of the winding of the contact insert.

11. The method according to claim 10, which further comprises filling the opening with an insulating material prior to the winding of the contact insert.

12. The method according to claim 10, which further comprises impregnating a wound insulating body with a resin.

\* \* \* \* \*